Figure 1:
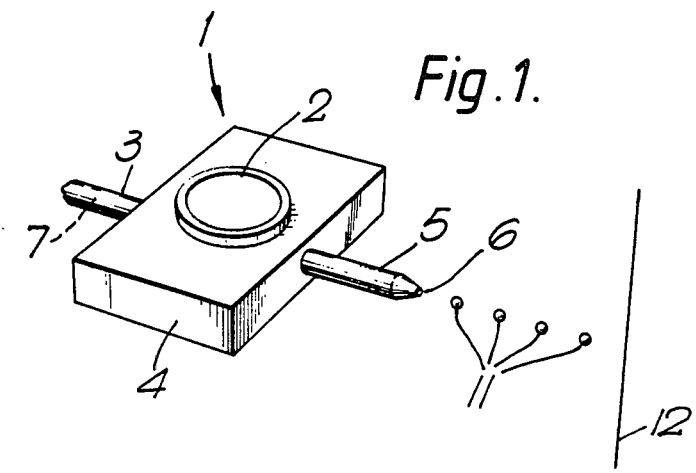

United States Patent [19]

Baxter et al.

[11] Patent Number: 4,772,323

[45] Date of Patent: Sep. 20, 1988

[54] INK COMPRISING AT LEAST ONE WATER SOLUBLE-FORMAZAN DYE, FREE FROM CELLULOSE-REACTIVE GROUPS

[75] Inventors: Anthony G. W. Baxter, Manchester; Stephen B. Bostock, Ramsbottom; David Greenwood, Oldham, all of England

[73] Assignee: Canon Kabushiki Kaisha, Tokyo, Japan

[21] Appl. No.: 67,262

[22] Filed: Jun. 29, 1987

Related U.S. Application Data

[62] Division of Ser. No. 909,848, Sep. 22, 1986.

[30] Foreign Application Priority Data

Oct. 7, 1985 [GB] United Kingdom ............... 8524697

[51] Int. Cl.$^4$ .................. C09D 11/00; C09D 11/02; C09D 11/16; C09D 11/18
[52] U.S. Cl. ........................................ 106/22; 8/641; 106/20; 534/652
[58] Field of Search .................. 534/652; 106/22, 28; 8/641

[56] References Cited

U.S. PATENT DOCUMENTS

| | | | |
|---|---|---|---|
| 3,068,219 | 12/1962 | Beffa | 534/618 |
| 3,202,650 | 8/1965 | Steinemann | 534/618 |
| 3,375,240 | 3/1968 | Beffa et al. | 534/652 |
| 3,497,493 | 2/1970 | Grossmann | 534/652 X |
| 3,926,942 | 12/1975 | Yelland | 534/618 |
| 4,024,123 | 5/1977 | Dussy et al. | 534/652 X |
| 4,079,049 | 3/1978 | Ramsay et al. | 534/652 |
| 4,556,401 | 12/1985 | Weitz et al. | 534/652 X |

FOREIGN PATENT DOCUMENTS

| | | | |
|---|---|---|---|
| 60-90264 | 5/1985 | Japan | 534/652 |
| 927128 | 5/1963 | United Kingdom | 534/652 |

*Primary Examiner*—Floyd D. Higel
*Attorney, Agent, or Firm*—Cushman, Darby & Cushman

[57] ABSTRACT

An ink comprising at least one water-soluble dye, free from cellulose-reactive groups, of the formula:

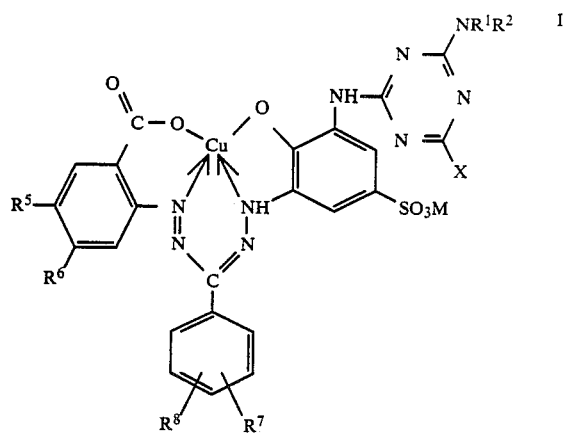

wherein, $R^1$ is $-(C_aH_{2a}O)_m(C_bH_{2b}O)_nH$,
$R^2$ is H or $-(C_aH_{2a}O)_m(C_bH_{2b}O)_nH$, or
$R^1$ and $R^2$ together with the nitrogen atom form a morpholine ring;
a and b are different and from 2 to 8
m is from 1 to 10; n is from 0 to 9;
M is H, ammonium or sodium, potassium or lithium;
X is (i) $NR^1R^2$, (ii) $NR^3R^4$, in which $R^3$ and $R^4$ are each independently selected from H, alkyl and aryl, or (iii) a mono- or dis-azo chromophore consisting of benzene, naphthalene or mono- or bicyclic heteroaryl diazo and coupling components linked to the triazine nucleus through an amino linking group, $NR^9$, in which $R^9$ is H, $C_{1-4}$-alkyl or phenyl;
$R^5$ and $R^6$ are selected from $SO_3M$ and H provided at least one is $SO_3M$;
$R^7$ is H, halogen, $C_{1-4}$ alkyl, $C_{1-4}$ alkoxy, $SO_3M$ or COOM; and $R^8$ is H or $SO_3M$.

The ink is particularly suited for ink jet printing having improved solution stability, excellent recording properties, ejection stability, ejection responsiveness and continuous recording workability.

36 Claims, 1 Drawing Sheet

U.S. Patent   Sep. 20, 1988   4,772,323

INK COMPRISING AT LEAST ONE WATER SOLUBLE-FORMAZAN DYE, FREE FROM CELLULOSE-REACTIVE GROUPS

This is a division of application Ser. No. 909,848, filed Sept. 22, 1986.

The invention relates to a water-soluble dye and to an ink containing the dye suitable for use in ink-jet printing.

According to the present invention there is provided a water-soluble dye, free from cellulose-reactive groups, of the formula:

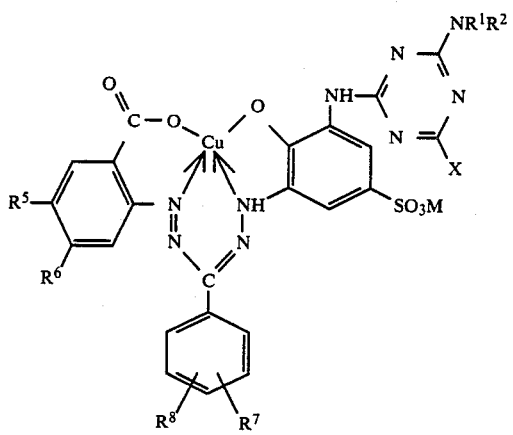

wherein
$R^1$ is $-(C_aH_{2a}O)_m(C_bH_{2b}O)_nH$,
$R^2$ is H or $-(C_aH_{2a}O)_m(C_bH_{2b}O)_nH$, or
$R^1$ and $R^2$ together with the nitrogen atom form a morpholine ring;
a and b are different and from 1 to 8
m is from 1 to 10;
n is from 0 to 9;
M is H, ammonium or a monovalent metal;
X is (i) $NR^1R^2$, (ii) $NR^3R^4$, in which $R^3$ and $R^4$ are each independently selected from H, alkyl and aryl, or (iii) a mono- or dis-azo chromophore comprising benzene, naphthalene or mono- or bi-cyclic heteroaryl diazo and coupling components linked to the triazine nucleus through an amino linking group;
$R^5$ and $R^6$ are selected from $SO_3M$ and H provided at least one is $SO_3M$;
$R^7$ is H, halogen, $C_{1-4}$ alkyl, $C_{1-4}$ alkoxy, $SO_3M$ or COOM; and
$R^8$ is H or $SO_3M$.

If the dye contains more than one $-(C_aH_{2a}O)_m(C_bH_{2b}O)_nH$ group these may be different, but are preferably identical. It is preferred that, in the group $NR^1R^2$, a and b are from 2 to 6 and more preferably 2 or 3, m is 1 or 2 and n is 0 or 1 or that $R^1$ and $R^2$ together with the nitrogen atom form a morpholine ring. Examples of groups represented by $R^1$ and $R^2$ are hydroxyethyl, 3-hydroxy-n-propyl, 6-hydroxy-n-hexyl and 3-(2-hydroxyethoxy)propyl. It especially preferred that $R^1$ is hydroxyethyl and $R^2$ is H; $R^1$ and $R^2$ are both hydroxyethyl or $NR^1R^2$ is morpholino.

Where X is $NR^3R^4$, $R^3$ is preferably H or $C_{1-4}$-alkyl and $R^4$ is preferably H, $C_{1-4}$-alkyl, mono- or bi-cyclic aryl or mono- or bi-cyclic heteroaryl. Where $R^4$ is aryl, it is preferably a phenyl or naphthyl radical carrying from one to three sulphonic acid groups, $SO_3M$, and optionally carrying from one to three, preferably one or two other substituents selected from $C_{1-4}$-alkyl, $C_{1-4}$-alkoxy, mono- or di-$C_{1-4}$-alkylamino, $C_{1-4}$-alkylcarbonylamino, unsubstituted and mono- and di-alkylamino-sulphonyl and carbonyl, ureido, phenylamino, nitro, halogen, especially chlorine, and hydroxy.

The amine linking group in X may be of the general formula $-NR^9-$ in which $R^9$ is preferably H, $C_{1-4}$-alkyl or phenyl, and especially preferably H or $CH_3$.

The monoazo chromophore represented by X preferably comprises a benzene or naphthalene diazo component and a benzene, naphthalene or monoheterocyclic coupling component and the disazo chromophore represented by X preferably comprises benzene or naphthalene diazo and coupling components. Examples of suitable diazo components are anilines and naphthylamines carrying from one to three groups selected from $C_{1-4}$-alkyl, $C_{1-4}$-alkoxy, $CONH_2$, $NH_2$, OH, F, Cl, Br, $CF_3$, Phenyl-CONH—, $C_{1-4}$alkyl-CONH— and especially $SO_3M$ or COOM such as 1,3-phenylenediamine-4-sulphonic acid; 2-methyl-1,4-phenylenediamine 4-methoxynitrobenzene-2-sulphonic acid; 3-ureidoaniline; 4-nitroaniline-2,5-disulphonic acid; 4-nitro-2-acetylaminoaniline; aniline; aniline-2-sulphonic acid; aniline-4-sulphonic acid; 4-(N-methylamino)aniline; 4-nitro-3-methoxyaniline; 2,5-dimethylaniline; 2-naphthylamine-3,6,8-trisulphonic acid 2-methyl-4-nitro-5-methoxyaniline; 3-nitroaniline-4,6-disulphonic acid; 4-methoxyaniline-2,5-disulphonic acid; aniline-2,4-disulphonic acid; aniline-2,5-disulphonic acid and 2-naphthylamine-1,5-disulphonic acid.

Examples of suitable coupling components are benzenes, naphthalenes, pyrazolin-5-ones and 2,6-dihydroxypyridines carrying from one to three groups selected from $C_{1-4}$-alkyl, $C_{1-4}$-alkoxy, $CONH_2$, $NH_2$, OH, F, Cl, Br, $CF_3$, Phenyl-CONH—, $C_{1-4}$alkyl-CONH— and especially $SO_3M$ or COOM such as 1-(4-sulphophenyl)-3-carboxy-pyrazolin-5-one 1-(4-sulphophenyl)-3-methyl-pyrazolin-5-one; 1-(2,5-dichloro-4-sulphophenyl)-3-methyl-pyrazolin-5-one; naphthalene-1,5-disulphonic acid; 1-aminonaphthalene-6-sulphonic acid J-acid; N-methyl J acid and Sulpho-J-acid; 1-ethyl-3-carbonamido-4-methyl-6-hydroxypyrid-2-one; 2,2'-disulpho-4'-nitro-4-aminostilbene; 2,5-dimethylaniline; H-Acid; N-acetyl-H-acid and N-benzoyl-H-Acid.

In both cases the chromophore preferably carries from one to five, and more preferably from two to four, sulphonic acid group and optionally carries from one to three other substituents such as those exemplified above for $R^4$. Examples of groups represented by X are 5-hydroxy-6-(2-sulphophenylazo)-7-sulphonaphth-2-ylamino 5-hydroxy-6-(1,5-disulphonaphth-2-ylazo)-7-sulphonaphth-2-ylamino 5-hydroxy-6-(2-sulpho-4-acetylaminophenylazo)-7-sulphonaphth-2-ylamino 5-hydroxy-6-(2,5-disulpho-4-methoxyphenylazo)-7-sulphonaphth-2-ylamino 5-hydroxy-6-(2-sulpho-4-methoxyphenylazo)-7-sulphonaphth-2-ylamino N-[5-hydroxy-6-(1,5-disulphonaphth-2-ylazo)-7-sulphonaphth-2-yl]-N-methylamino N-[5-hydroxy-6-(2-sulpho-4-methoxyphenylazo)-7-sulphonaphth-2-yl]-N-methylamino 3-ureido-4-(3,6,8-trisulphonaphth-2-ylazo)phenylamino 3-ureido-4-(2,5-dimethyl4-[2,5-disulphophenylazo]-phenylazo)phenylamino 3-sulpho-4-(1-[4-sulpho-phenyl]-3-carboxypyrazolin-
  5-on-4-ylazo)phenylamino
N-(4-[3-sulpho-4-(4-nitro-2-sulphophenylethenyl)-
  phenylazo]-phenyl)-N-methylamino
4-sulpho-3-(1-[4-sulpho-phenyl]-3-carboxypyrazolin-
  5-on-4-ylazo)phenylamino
4-sulpho-3-(1-[2,5-dichloro-4-sulphophenyl]-3-methyl-
  5-hydroxypyrazol-4-ylazo)-phenylamino
4-sulpho-3-(1-hydroxy-3,6-disulphonaphth-2-ylazo)-
  phenylamino
4-sulpho-3-(1-hydroxy-3,6-disulpho-7-ben-
  zoylaminonaphth-2-ylazo)phenylamino
6-sulpho-7-(3,6,8-trisulphonaphth-2-ylazo)-8-hydrox-
  ynaphth-2-ylamino
2,4-disulpho-5-(1-ethyl-2,6-dihydroxy-3-aminocarbo-
  nyl-4-methylpyrid-5-ylazo)phenylamino
2,5-disulpho-4-(1-[4-sulphophenyl]-3-methyl-5-
  hydroxy-pyrazol-4-ylazo)phenylamino
3,6-disulpho-7-phenylazo-8-hydroxynaphth-1-ylamino
2-methyl-4-(2,5-disulphophenylazo)phen-1-ylamino
4-(2-methyl-4-[2,5-disulphophenylazo]-5-methoxy-
  phenylazo)-6-sulphonaphth-1-ylamino
3-methyl-4-(4,8-disulphonaphth-2-ylazo)phenylamino
2-methoxy-4-(3-sulphophenylazo)phenylamino
2-methoxy-5-methyl-4-(4,8-disulphonaphth-2-ylazo)-
  phenylamino
3-acetylamino-4-(4,8-disulphonaphth-2-ylazo)-
  phenylamino
3-acetylamino-4-(2,5-dimethyl-4-[2,5-disulpho-
  phenylazo]phenylazo)phenylamino.

A preferred class of dyes of Formula I contains from one to three, preferably one or two, azo groups, i.e. X represents a mono- or disazo chromophore. Such dyes are generally dark blue or black in shade, have generally good solubility and fastness properties and are adapted for use in inks suitable for droplet printing.

It is preferred that $R^5$ is $SO_3M$ and $R^6$ is H and it is also preferred that $R^7$ is in the 2- or 4-positions with respect to the link with the formazan ring and is selected from H, $SO_3M$ and Cl and that $R^8$ is in the 5-position and is selected from H and $SO_3M$. Specific examples of the phenyl group carrying $R^7$ and $R^8$ are phenyl, 2-sulphophenyl, 4-sulphophenyl, 2,4-disulpho phenyl and 2-chloro-5-sulphophenyl.

Water-solubility is enhanced by the presence of acid groups such as —COOM and $SO_3M$ and also by groups represented by $NR^1R^2$, especially where $R^1$ and/or $R^2$ is hydroxyethyl or $NR^1R^2$ is morpholino. It is preferred that the dye carries from 4 to 10, and more preferably from 5 to 8, such water-solubilising groups. However, $SO_3M$ groups are generally superior to —COOM groups at confering water-solubility and it is preferred that each chromophore, i.e. each of the formazan and the azo chromophores, carries from 2 to 5, more preferably 3 to 5, $SO_3M$ groups and that the whole molecule carries from 3 to 8, more preferably 4 to 7, $SO_3M$ groups.

The species M, is preferably H, ammonium or an alkali metal and more preferably ammonium, including substituted ammonium such as mono-, di-, tri- or quaternary-alkyl- or substituted alkyl-ammonium, e.g hydroxyalkylammonium, or an alkali metal, such as sodium, potassium or lithium Examples of especially preferred water-soluble dyes are the following acid dyes:

Dye 1

A dye of Formula I in which $R^1=C_2H_4OH$, $R^5=SO_3Na$, $R^2=R^6=R^7=R^8=H$, $M=Na$ and X is 5-hydroxy-6-(2-sulphophenylazo)-7-sulphonaphth-2-ylamino as the sodium salt.

Dye 2

A dye of Formula I in which $—NR^1R^2=$morpholino, $R^5=SO_3Na$, $R^6=R^7=R^8=H$, $M=Na$ and X is 6-sulpho-7-(3,6,8-trisulphonaphth-2-ylazo)-8-hydroxynaphth-2-ylamino as the sodium salt.

Dye 3

A dye of Formula I in which $R^1=R^2=C_2H_4OH$, $R^5=SO_3Na$, $R^6=R^7=R^8=H$, $M=Na$ and X is 3-sulpho-4-(1-[4-sulphophenyl]-3-carboxypyrazolin-5-on-4-ylazo)-phenylamino as the sodium salt.

Dye 4

A dye of Formula I in which $R^1=C_2H_4OH$, $R^5=SO_3Na$, $R^2=R^6=R^7=R^8=H$, $M=Na$ and X is 3-ureido-4-(3,6,8-trisulphonaphth-2-ylazo)-phenylamino as the sodium salt.

Dye 5

A dye of Formula I in which $R^1=C_2H_4OH$, $R^5=SO_3Na$, $R^2=R^6=R^7=R^8=H$, $M=Na$ and X is 3-ureido-4-(2,5-dimethyl-4-[2,5-disulphophenylazo]-phenylazo)phenylamino as the sodium salt.

Dye 6

A dye of Formula I in which $R^1=C_2H_4OH$, $R^5=SO_3Na$, $R^2=R^6=R^7=R^8=H$, $M=Na$ and X is 5-hydroxy-6-(1,5-disulphonaphth-2-ylazo)-7-sulphonaphth-2-ylamino as the sodium salt.

Dye 7

A dye of Formula I in which $R^1=C_2H_4OH$, $R^5=SO_3Na$, $R^2=R^6=R^7=R^8=H$, $M=Na$ and X is N-[5-hydroxy-6-(1,5-disulphonaphth-2-ylazo)-7-sulphonaphth-2-yl]-N-methylamino as the sodium salt.

Dye 8

A dye of Formula I in which $R^1=R^2=C_2H_4OH$, $R^5=SO_3Na$, $R^6=R^7=R^8=H$, $M=Na$ and X is 3-(1-[4-sulphophenyl]-3-carboxypyrazolin-5-on-4-ylazo)-4-sulphophenylamino as the sodium salt.

Dye 9

A dye of Formula I in which $R^1=$3-hydroxypropyl, $R^2=H$, $R^5=R^6=SO_3M$, $R^7=R^8=H$, $M=Na$ and X is 3-methyl-4-(4,8-disulphonaphth-2-ylazo)phenylamino as the sodium salt.

Dye 10

A dye of Formula I in which $R^1=(CH_2)_6OH$, $R^6=SO_3M$, $R^2=R^5=R^7=R^8=H$, $M=Na$ and $X=$5-hydroxy-6-(2-sulpho-4-methoxyphenylazo)-7-sulphonaphth-2-ylamino as the sodium salt.

Dye 11

A dye of Formula I in which $R^1=C_2H_4OH$, $R^5=SO_3M$, $R^7=$2-$SO_3M$, $R^2=R^6=R^8=H$, $M=Na$ and X is N-[5-hydroxy-6-(2-sulpho-4-methoxyphenylazo)-7-sulphonaphth-2-yl]-N-methylamino as the sodium salt.

Dye 12

A dye of Formula I in which $R^1=C_2H_4OH$, $R^5=SO_3Na$, $R^2=R^6=R^8=H$, $R^7=4\text{-}SO_3M$, $M=Na$ and X is 2,4-disulpho-5-(1-ethyl-2,6-dihydroxy-3-aminocarbonyl-4-methylpyrid-5-ylazo)phenylamino as the sodium salt.

Dye 13

A dye of Formula I in which $R^1=C_2H_4OH$, $R^5=SO_3Na$, $R^2=R^6=H$, $R^7=2\text{-}Cl$, $R^8=5\text{-}SO_3M$, $M=Na$ and X is 2,5-disulpho-4-(1-[4-sulphophenyl]-3-methyl-5-hydroxypyrazol-4-ylazo)phenylamino as the sodium salt.

Dye 14

A dye of Formula I in which $R^1=C_2H_4OH$, $R^5=SO_3Na$, $R^2=R^6=H$, $R^7=2\text{-}SO_3M$, $R^8=4\text{-}SO_3M$, $M=Na$ and X is 4-sulpho-3-(1-[2,5-dichloro-4-sulphophenyl]-3-methyl-5-hydroxypyrazol-4-ylazo)-phenylamino as the sodium salt.

Dye 15

A dye of Formula I in which $R^1=C_2H_4OH$, $R^5=SO_3Na$, $R^2=R^6=R^7=R^8=H$, $M=Na$ and X is N-(4-[3-sulpho-4-(4-nitro-2-sulphophenylethenyl)-phenylazo]-phenyl)-N-methylamino as the sodium salt.

Dye 16

A dye of Formula I in which $R^1=C_2H_4OH$, $R^5=SO_3Na$, $R^2=R^6=R^7=R^8=H$, $M=Na$ and X is 3-acetylamino-4-(4,8-disulphonaphth-2-ylazo)-phenylamino as the sodium salt.

Dye 17

A dye of Formula I in which $R^1=C_2H_4OH$, $R^5=SO_3Na$, $R^2=R^6=H$, $R^7=2\text{-}SO_3M$, $R^8=4\text{-}SO_3M$, $M=Na$ and X is 2-methoxy-4-(3-sulphophenylazo)-phenylamino as the sodium salt.

Dye 18

A dye of Formula I in which $R^1=(CH_2)_6OH$, $R^6=SO_3M$, $R^2=R^5=R^7=R^8=H$, $M=Na$ and $X=$5-hydroxy-6-(2-sulpho-4-acetylaminophenylazo)-7-sulphonaphth-2-ylamino as the sodium salt.

Dye 19

A dye of Formula I in which $R^1=(CH_2)_6OH$, $R^6=SO_3M$, $R^2=R^5=R^7=R^8=H$, $M=Na$ and $X=$5-hydroxy-6-(2,5-disulpho-4-methoxyphenylazo)-7-sulphonaphth-2-ylamino as the sodium salt.

Dye 20

A dye of Formula I in which $R^1=C_2H_4OH$, $R^5=SO_3Na$, $R^2=R^6=H$, $R^7=2\text{-}Cl$, $R^8=5\text{-}SO_3M$, $M=Na$ and X is 2-methoxy-5-methyl-4-(4,8-disulphonaphth-2-ylazo)phenylamino as the sodium salt.

Dye 21

A dye of Formula I in which $R^1=C_2H_4OH$, $R^5=SO_3Na$, $R^2=R^6=R^7=H$, $R^8=4\text{-}SO_3M$, $M=Na$ and X is 4-sulpho-3-(1-hydroxy-3,6-disulphonaphth-2-ylazo)phenylamino as the sodium salt.

Dye 22

A dye of Formula I in which $R^1=C_2H_4OH$, $R^5=SO_3M$, $R^2=R^6=R^8=H$, $R^7=2\text{-}SO_3M$, $M=Na$ and X is 4-sulpho-3-(1-hydroxy-3,6-disulpho-7-benzoylaminonaphth-2-ylazo)-phenylamino as the sodium salt.

Dye 23

A dye of Formula I in which $R^1=C_2H_4OH$, $R^5=SO_3M$, $R^2=R^6=H$, $R^7=R^8=2,4\text{-}SO_3M$, $M=Na$ and X is 3,6-disulpho-7-phenylazo-8-hydroxynaphth-1-ylamino as the sodium salt.

Dye 24

A dye of Formula I in which $R^1=C_2H_4OH$, $R^5=SO_3Na$, $R^2=R^6=H$, $R^7=2\text{-}Cl$, $R^8=5\text{-}SO_3M$, $M=Na$ and X is 4-(2-methyl-4-[2,5-disulphophenylazo]-5-methoxyphenylazo)-6-sulphonaphth-1-ylamino as the sodium salt.

The dyes of Formula I may be prepared by (i) reacting an aminoformazan compound of the formula:

II wherein $R^5$, $R^6$, $R^7$, $R^8$ and M have the meanings given above, with cyanuric chloride, under conditions such that one chlorine atom of the triazine is replaced by the formazan residue, (ii) reacting the mono-substituted triazine with an amine, X—H, under conditions such that a second atom of chlorine is replaced by X and (iii) reacting the di-substituted triazine with an amine, $HNR^1R^2$, under conditions such that the third chlorine atom is replaced by $NR^1R^2$.

Where the group X is a chromophore linked to the triazine ring through the 1-amino group of an H acid moiety, the compound of Formula I is more conveniently prepared by reacting cyanuric chloride with the chromophore and then reacting the monosubstituted triazine with an aminoformazan of Formula II.

Aminoformazan compounds of Formula II, their preparation and their reaction with cyanuric chloride have been fully described in the prior art, for example in U.K. patent specification No. 1389053.

The present invention in so far as it relates to dyes is further illustrated with reference to the following Examples in which all parts and percentages are by weight, unless otherwise indicated.

EXAMPLE 1

Stage 1

To a solution of 5-hydroxy-6-(2-sulphophenylazo)-7-sulphonaphth-2-ylamine (0.05M) in water (500 g) at pH 5.5–6 and 0°–5° C., was added a solution of cyanuric chloride (10 g) in acetone (50 g). The temperature was maintained at 0°–5° C. by external cooling and the pH at 5.5–6 by the addition of 1M sodium hydroxide solution. After 45 minutes the reaction was complete.

Stage 2

To a solution of the amino-formazan of Formula II in which $R^5=SO_3Na$, $R^6=H$, $R^7=H$ (0.05M) in water (1000 ml) at pH 7 and 30°–35° C., was added the filtered product of stage 1. The pH was maintained at 7–7.5 by the addition of 1M sodium hydroxide solution and the temperature at 35°–40° C. After 3 hours the reaction was complete.

Stage 3

To the product of Stage 2 was added ethanolamine (25 g) and the temperature raised to 50°–60° C. for 18 hours. The volume was then adjusted to 2000 ml and salt (20% w/v) added. The product was filtered off, washed with brine (20% w/v; 1000 g) and pulled dry. The product was dissolved in the minimum of water at pH 7.5, and subjected to dialysis. The resulting solution, free from inorganic matter, was evaporated to dryness at 50°–60° C. in vacuum to yield the dye hereinbefore identified as Dye 1 i.e. the dye of Formula I in which $R^1$=hydroxyethyl, $R^2=R^6=R^7=R^8=H$, $R^5=SO_3Na$ and X is 5-hydroxy-6-(2-sulphophenylazo)-7-sulphonaphth-2-ylamino.

EXAMPLE 2

The procedure of Example 1 was followed except that in Stage 1, 5-hydroxy-6-(3,6,8-trisulphonaphth-2-ylazo)-7-sulphonaphth-3-yl-amine was employed; and in Stage 3, morpholine was employed, to yield the dye hereinbefore identified as Dye 2, i.e. the dye of Formula I in which $NR^1R^2$ is morpholino, $R^5=SO_3Na$, $R^6=R^7=R^8=H$ and X is 5-hydroxy-6-(3,6,8-trisulphonaphth-2-ylazo)-7-sulphonaphth-3-ylamino.

EXAMPLE 3

The procedure of Example 1 was followed except that in Stage 1, 3-sulpho-4-(1-[4-sulphophenyl]-3-carboxy-pyrazolin-5-on-4-ylazo)-phenylamine and in Stage 3, diethanolamine, were employed, to yield the dye hereinbefore identified as Dye 3 i.e. the dye of Formula I wherein $R^1=R^2=C_2H_4OH$, $R^6=R^7=R^8=H$, $R^5=SO_3Na$ and X is 3-sulpho-4-(1-[4-sulphophenyl]-3-carboxypyrazolin-5-on-4-ylazo)phenylamino.

EXAMPLE 4

The procedure of Example 1 was followed except that in Stage 1, 3-ureido-4-(3,6,8-trisulphonaphth-2-ylazo)-phenylamine was employed to yield the dye hereinbefore identified as Dye 4 i.e. the dye of Formula I wherein $R^1$, $R^2$, $R^5$, $R^6$, $R^7$ and $R^8$ are as in Example 1 and X is 3-ureido-4-(3,6,8-trisulphonaphth-2-ylazo)-phenylamino.

EXAMPLE 5

The procedure of Example 1 was followed except that in Stage 1, 3-ureido-4-(4-[2,5-disulphophenylazo]-2,5-dimethylphenylazo)-phenylamine was employed to yield the dye hereinbefore identified as Dye 5 i.e. the dye of Formula I wherein $R^1$, $R^2$, $R^5$, $R^6$, $R^7$ and $R^8$ are as in Example 1 and X is 3-ureido-4-(4-[2,5-disulphophenylazo]-2,5-dimethylphenylazo)-phenylamino.

EXAMPLE 6

The procedure of Example 1 was followed except that in Stage 1, 5-hydroxy-6-(1,5-disulphonaphth-2-ylazo)-7-sulphonaphth-2-ylamine was employed to yield the dye hereinbefore identified as Dye 6 i.e. the dye of Formula I wherein $R^1$, $R^2$, $R^5$, $R^6$, $R^7$ and $R^8$ are as in Example 1 and X is 5-hydroxy-6-(1,5-disulphonaphth-2-ylazo)-7-sulphonaphth-2-ylamino.

EXAMPLE 7

The procedure of Example 1 was followed except that in Stage 1, N-methyl-5-hydroxy-6-(1,5-disulphonaphth-2-ylazo)-7-sulphonaphth-2-ylamine was employed to yield the dye hereinbefore identified as Dye 7 i.e the dye of Formula I wherein $R^1$, $R^2$, $R^5$, $R^6$, $R^7$ and $R^8$ are as in Example 1 and X is N-[5-hydroxy-6-(1,5-disulphonaphth-2-ylazo)-7-sulphonaphth-2-yl]-N-methylamino.

EXAMPLE 8

The procedure of Example 1 was followed except that in Stage 1, 3-(1-[4-sulphophenyl]-3-carboxy-pyrazolin-5-on-4-ylazo)-4-sulphophenylamine and in Stage 3, diethanolamine, were employed, to yield the dye hereinbefore identified as Dye 8 i.e. the dye of Formula I wherein $R^1$, $R^2$, $R^5$, $R^6$, $R^7$ & $R^8$ are as defined in Example 3 and X is 3-(1-[4-sulphophenyl]-3-carboxypyrazolin-5-on-4-ylazo)-4-sulphophenylamino.

The aforementioned water-soluble dyes of Formula I are adapted for use in an ink, particularly a writing or printing ink based upon water and/or a water-miscible organic solvent, such as an alkanol or glycol, and especially an ink suitable for ink-jet printing wherein the ink is ejected from an orifice of a recording head in the form of liquid droplets.

For recording on paper or the like with writing tools (fountain pen, felt pen, etc.), it is conventional to use an ink which is a solution of a dye in water or a water miscible organic solvent and an ink of similar composition is also used in ink-jet printing.

In ink-jet printing, droplets of ink are generated in various ways and deposited on a substrate to effect a record. A suitable ink comprises, an essential components, a recording agent (usually a dye or a pigment) and a liquid vehicle (usually water, an organic solvent or mixtures thereof) and, as optional components, various other additives.

Ink-jet printing may be classified into various systems depending on the method for generation of ink droplets and the method for controlling the flight direction of ink droplets. An example of a device in accordance with one system is shown in FIG. 1.

The device shown in FIG. 1 operates by providing a printing signal at the print head section having a piezoelectric oscillator and generating ink droplets corresponding to said signal. In FIG. 1, a print head 1, comprises a piezo-oscillator 2, an inlet line 3 for ink, a liquid chamber 4, and an outlet line 5 leading to a nozzle 6 directed at a substrate 12. Ink 7 is introduced into the liquid chamber 4, through inlet 3 and fills the chamber 4 and the outlet line up to the nozzle 6. A pulsed electrical signal derived from a pattern information signal is applied to the piezo-electric oscillator 2 which transforms the pulsed electrical signal into pressure pulses and applies these to the ink 7 in the liquid chamber 4. As a result, the ink 7 is discharged as droplets 11 through the nozzle 6 thereby to effect recording on the surface of the substrate 12.

Figure 2:
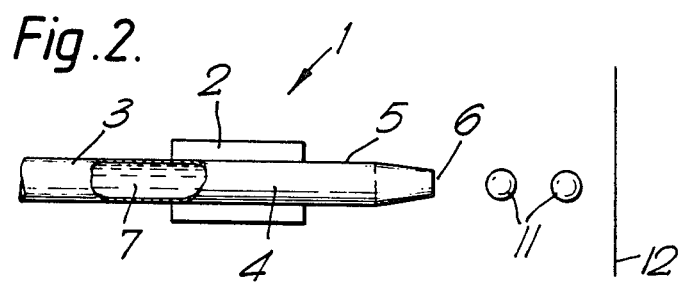

An example of another type of device using the same system is shown in FIG. 2, in which a tubular liquid chamber 4 links the inlet and outlet lines 3, 5 and a cylindrical piezoelectric oscillator 2 is arranged around the outer peripheral portion of the chamber 4. The mechanism for generation of ink droplets is essentially the same as in the device as shown in FIG. 1.

In another system, charged droplets are continuously generated but only a proportion of the droplets are selected for recording.

Figure 3:
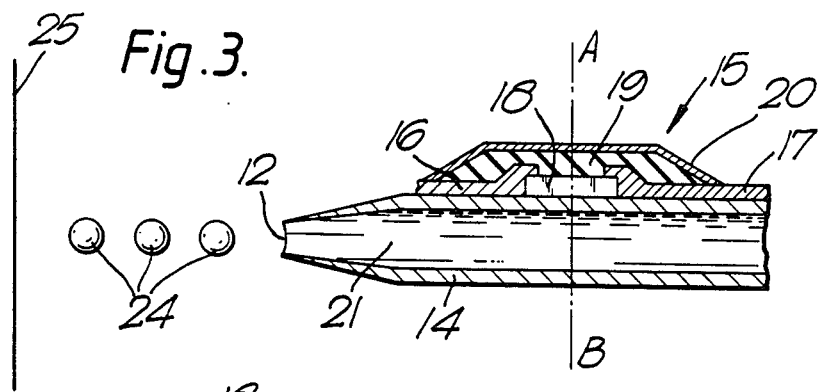
Figure 4:
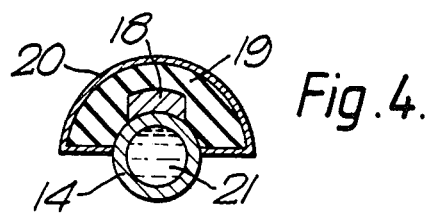

In yet another system, heat energy corresponding to the pattern information signal is imparted to the ink in the chamber of print head, and liquid droplets are formed by said energy. An embodiment of such a device is shown in FIGS. 3 and 4. FIG. 3 is a cross-sectional view along the length of a tube 14 in a print head 13 and FIG. 4 is a cross-sectional view taken on the line A–B in FIG. 3.

In FIGS. 3 and 4 a print head 13, for heat sensitive recording by the deposit of droplets 24 of ink 21 on a substrate 25, comprises a thin-walled tube 14 terminating at a nozzle 12 carrying a heat generator 15. The heat generator 15 comprises a pair of spaced aluminium electrodes 16, 17, defining a gap occupied by a nichrome heating resistor 18 the ends of the electrodes 16, 17 and the resistor 18 being encased in a layer of insulant 19 and a protective envelope 20.

In operation an ink 21 is fed into the right hand end of the tube 14 under slight pressure and forms a meniscus at the nozzle 12.

The application of a pulsed electric signal, derived from a pattern information signal, across the electrodes 16, 17, generates pulses of heat in the resistor 18 which are transferred across the wall of the tube and cause the formation of bubbles in the ink 21 adjacent to the resistor 18. The excess pressure developed by the bubbles causes discharge of the ink 21 from the nozzle 12 in the form of small droplets 24, each corresponding to a electric pulse, directed at the substrate 25.

As ink-jet printing generates little noise and allows high speed multi-colour operation without the need for special dye fixation treatments, a number of different ink-jet printing systems are currently being intensively investigated.

An ink for any of the various types of ink-jet printing systems need to meet the following criteria:
(1) Physical properties of the ink, such as viscosity and surface tension, are each within a defined range.
(2) All solutes have good solubility in the ink medium to give solutions having good stability which do not plug the fine ejecting orifices (hereinafter referred to as "solution stability").
(3) The recording agent gives images of sufficient optical density.
(4) The ink does not change in physical properties or deposit solid matter during storage.
(5) Printing can be performed without a restriction on the nature of substrate on which a record is made.
(6) The ink exhibits a high rate of fixation.
(7) The ink gives images of good resolution and having good resistance to water, solvent (particularly alcohol), light, weather and abrasion.

However, images produced by conventional inks, particularly water-based inks, tend to form blots, dislocations or scratches, or to fade by water adhesion, mechanical friction, or exposure to light and an ink free from these drawbacks is an urgent requirement.

In addition to the above criteria, an ink for use in an ink jet printing process using heat energy, must also have excellent heat stability. The ink, if thermally unstable, is liable to undergo chemical change because it is exposed to a high temperature during repetition of the generation and extinction of bubbles by heating, with the result that insoluble matter forms and deposits on the wall of the heating zone of the recording head, which, in turn, renders the recording head to be eventually incapable of discharging the liquid therethrough. Accordingly, the thermal stability of the ink is very important for continuous high-speed recording over a long period of time.

Although a number of inks have been proposed to overcome these problems, none have been produced which meet all the foregoing requirements.

According to a second feature of the present invention there is provided an ink comprising a water-soluble dye of Formula I.

It is possible, by use of a dye in accordance with Formula I to obtain an ink having an improved solution stability, particularly during a prolonged storage in concentrated form, and having excellent recording properties, particularly ejection stability, ejection responsiveness, and continuous recording workability.

The present ink is of practical importance and gives images having good water resistance, alcohol resistance and light resistance.

The present ink preferably comprises the dye and a liquid medium, such as water, an organic solvent or a mixture thereof. The dye of the first feature of the present invention has especially good solution stability in the above-mentioned liquid medium, thereby improving the ejection stability of the ink and reducing the incidence of plugging of the ejecting orifice even after a long period of storage in the recording apparatus.

The amount of the dye in the ink is determined in accordance with the desired optical density of the image, the type of recording device to be used, other components to be added, the required physical properties of ink, etc. But generally speaking, a suitable dye content is in the range of 0.5–20%, preferably 0.5–15%, and especially 1–10%, by weight based on the total weight of the ink.

The present ink can contain, besides the hereinbefore defined dye of Formula I, other dyes selected from various types of known dyes such as direct dyes, acid dyes, and the like but preferably contain only dye in accordance with the first aspect of the present invention or dyes having similar performance characteristics in ink jet printing.

Liquid media used for preparing the present ink include water and mixtures of water with various water-soluble organic solvents. The water-soluble organic solvents include $C_1$–$C_4$ alkanols such as methanol, ethanol, n-propanol, isopropanol, n-butanol, sec-butanol, tert-butanol, isobutanol; amides such as dimethylformamide and dimethylacetamide; ketones or ketone alcohols such as acetone and diacetone alcohol; ethers such as tetrahydrofuran and dioxane; nitrogen-containing heterocyclic ketones such as N-methyl-2-pyrrolidone and 1,3-dimethyl-2-imidazolidone; polyalkylene glycols such as polyethylene glycol and polypropylene glycol; alkylene glycols and thioglycols containing $C_2$–$C_6$ alkylene groups such as ethylene glycol, propylene glycol, butylene glycol, triethylene glycol; thiodiglycol, hexylene glycol, and diethylene glycol; other polyols such as glycerol, 1,2,6-hexanetriol; and lower alkyl ethers of polyhydric alcohols such as 2-methoxyethanol, 2-(2-methoxyethoxy)ethanol, 2-(2-ethoxyethoxy)ethanol and 2-[2-(2-methoxyethoxy)ethoxy]ethanol, 2-[2-(2-ethoxyethoxy)ethoxy]-ethanol.

Preferred water-soluble organic solvents among these are glycols and glycol ethers, such as ethylene glycol, diethylene glycol, triethylene glycol and 2-methoxy-2-ethoxy-2-ethoxyethanol; polyethylene glycols with molecular weights up to 500; and heterocyclic ketones such as N-methylpyrrolidone and 1,3-dimethyl-2--imidazolidone. Preferred specific solvent mixtures are a binary mixture of water and diethylene glycol and a tertiary mixture of water, diethylene glycol and N-methyl-pyrrolidone.

The present ink preferably contains from 5–95%, preferably 10–80%, and especially 20–50%, by weight of water-soluble organic solvent based on the total weight of the ink.

The present ink, prepared from the components mentioned above, is generally characterised by excellent and balanced recording performance characteristics i.e. signal responsiveness, stability for producing droplets, ejection stability, long-term continuous recording workability, and ejection stability after a long rest. It also generally exhibits good preservation stability, solution stability, fixation on the recording substrate and resistance of the recorded image to water, alcohol, light and weather. However, miscellaneous known additives may also be incorporated into the present ink for further improvement of these characteristics. Examples of suitable additives are viscosity modifiers, such as poly(vinyl alcohol), cellulose derivatives, and other water-soluble resins; various kinds of surfactants, i.e. cationic, anionic, and nonionic; surface tension modifiers, such as diethanolamine and triethanolamine; and pH conditioners, such as buffers.

Inks for use in ink-jet recording of the type based on the application of a charge to the ink droplets usually contain an inorganic salt, such as lithium chloride, ammonium chloride or sodium chloride as a resistivity modifier. Urea or thiourea may also be added to improve the water-retentivity of the ink at the tip of the ejecting orifice. When the present ink is used for ink-jet recording of the type based on the action of thermal energy, the thermal properties, e.g. specific heat, coefficient of thermal expansion, and heat conductivity, of the ink may be modified by suitable additives.

If the present ink is to be applied by means of a writing tool, e.g. a pen, it may be necessary to modify the viscosity and the other physical properties in relation to the affinity of the ink for the recording substrate.

The present ink represents a significant step towards satisfying all the requirements stated above, that is to say, to providing an ink which does not plug capillary tubes or ejecting orifices, does not result in deterioration or formation of precipitate during storage, is excellent in recording workability, particularly ejection ability and ejection responsiveness; and gives such good quality images as to be excellent in colour density, shade, and contrast and have good resistance to water, solvent, light weather, and abrasion and excellent fixing properties.

Furthermore, certain preferred classes of the present inks are particularly suitable for use in an ink jet recording process utilising thermal energy because of their good long term heat stability.

The present invention in so far as it relates to inks is further illustrated with reference to the following Examples in which all parts and percentages are by weight unless otherwise indicated.

EXAMPLE 9

Three inks were prepared in accordance with the following recipe, using the Dyes 1 to 2 and 4 as described above:

| Dye | 5 parts |
|---|---|
| Diethylene glycol | 35 parts |
| Deionised water | 60 parts |

The above-mentioned inks were prepared by thorough mixing of the ingredients, filtering the solution under pressure through a Teflon filter (pore size: 1 micron) and degassing the filtered ink, in vacuo. For each ink, the following five characteristics, $T_1$–$T_5$, were measured using a recording apparatus having an on-demand type of recording head (50 micron-diameter ejecting orifice, piezo-oscillator driving voltage 60 V, frequency 4 KHz). Each ink gave good results in each test.

$T_1$—Prolonged Storage stability

Each ink was sealed separately in a glass container and stored at $-30°$ C. and at $60°$ C. for 6 months. In each case there was no appreciable separation of any insoluble matter or any change in physical properties and colour.

$T_2$—Ejection Stability

Each ink was subjected to continuous recording tests at room temperature, $5°$ C., and $40°$ C. for 24 hours and gave high quality images constantly throughout the test period at each temperature.

$T_3$—Ejection Responsiveness

Each ink was subjected to intermittent ejection at two-second intervals and ejection after standing for two months and showed stable uniform recording without causing plugging of the orifice.

$T_4$—Quality of Recorded Image

Images recorded on the following three types of recording paper were of high optical density and sharp and clear in all cases. Each image, after exposure to ambient light in a room for three months, showed a reduction in optical density not greater than 1%. Results of immersing the recorded papers in water for one minute showed a very little blotting of the images.

| Paper | Supplier |
|---|---|
| IJ recording paper type S | Mitsubishi Paper Mills Ltd. |
| IJ recording paper type M | Mitsubishi Paper Mills Ltd. |
| IJ recording paper type L | Mitsubishi Paper Mills Ltd. |

$T_5$—Fixing Properties for Recording Member

Images recorded on the above-mentioned three types of recording paper were rubbed with a finger 15 seconds after recording, and without forming any smudges or blots, indicating the excellent fixation properties of the images.

EXAMPLE 10

An element for transforming electric energy into thermal energy was prepared on an alumina substrate as follows.

An SiO₂ (lower) layer 5 microns thick was formed over the alumina substrate by sputtering and a 1000 Å HfB₂ layer, as a heat generating resistor layer, and a 3000 Å aluminum layer, as an electrode, were successively laid thereover. A heat generating resistor pattern having size of 50×200 microns was formed by selective etching of the aluminum layer. A SiO₂ layer, 0.35 microns thick, as a protective (upper) layer, was then laid thereover. A print head was formed by bonding a glass plate on which grooves 50 microns wide and 50 microns deep had been engraved onto the SiO₂ protective layer in register with the etched pattern on the heat generating resistor. The tip surface of orifice was then polished so that the distance between the tip of heat generating resistance and the tip surface of orifice was 250 microns.

The print head was operated by applying printing signals of 40 V×10⁻⁵ sec rectangular voltage pulses at a cycle of 2×10⁻⁴ sec. The print head operated normally and without blockage for 120 hours using an ink having the following composition:

| | |
|---|---|
| Dye 1 (decomp'n temp: 265° C.) | 5 parts |
| Diethylene glycol | 25 parts |
| N—methyl-2-pyrrolidone | 20 parts |
| Water | 50 parts |

In a comparative test the print head operated satisfactorily for only 10 hours, under the same conditions as above, using an ink having the same composition as the above ink except for the replacement of Dye 1 with a dye of the formula:

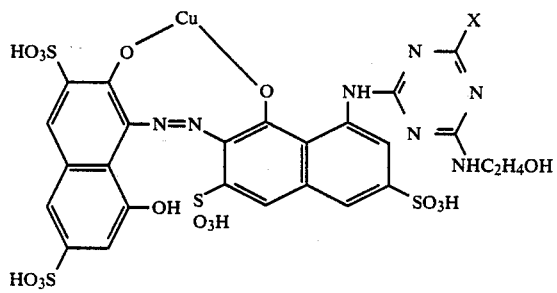

wherein X is 4-(1,5-disulphonaphth-3-ylazo)-phenylamino.

EXAMPLES 11-15

The print head was operated similarly to Example 10 using inks having the composition set out in Example 10, except for the replacement of Dye 1 by the dyes listed in Table 1, by applying printing signals of 50 V×10⁻⁵ sec rectangular voltage pulses at a cycle of 2×10⁻⁴ sec. The resulting satisfactory operating periods are shown in Table 1.

TABLE 1

| Example No. | Composition of ink Dye | Content (wt %) | Satisfactory Operating Period (hours) |
|---|---|---|---|
| 11 | 1 | 5 | 135 |
| 12 | 1 | 6 | 105 |
| 13 | 2 | 5 | 160 |
| 14 | 4 | 5 | 110 |
| 15 | 8 | 6 | 140 |

An increase in the amount of dye was compensated by a reduction in the amount of water.

EXAMPLE 16

Each of the inks prepared in Examples 9 and 17 to 22 was charged separately into a commercial fountain pen and a record was made on plain paper. Each record showed no blotting of image and a high rate of absorption of the ink.

EXAMPLES 17 TO 22

Inks having the compositions defined in Table 2 were prepared and tested for properties $T_1$-$T_5$, in the same manner as in Example 9.

The results indicated that all these inks have good characteristics, and particularly excellent recording performance, fixation properties and sharpness of image.

TABLE 2

| Example No. | Dye (parts) | Liquid medium and other components (parts) |
|---|---|---|
| 17 | 1 (3) | Water (67) |
| | | Diethylene glycol (30) |
| | | Methyl p-hydroxybenzoate (0.1) |
| 18 | 2 (3) | Water (62) |
| | | Ethylene glycol (39) |
| | | 1,2,6-Hexanetriol (5) |
| 19 | 2 (2) | Water (68) |
| | | 2-Methoxy-2-ethoxy-2-ethoxyethanol (30) |
| | | Polyoxyethylated 4-nonylphenol (0.1) |
| 20 | 1 (3) | Water (57) |
| | | Ethyl alcohol (10) |
| | | Glycerol (30) |
| | | Sodium dehydroacetate (0.1) |
| 21 | 4 (3) | Water (52) |
| | | Diethylene glycol (30) |
| | | N—methyl-2-pyrrolidone (15) |
| 22 | 8 (3) | Water (52) |
| | | Diethylene glycol (30) |
| | | N—methyl-2-pyrrolidone (15) |

Inks in accordance with the present invention and having similar properties to those described in Examples 9 to 22 can be prepared using any of Dyes 1 to 24 hereinbefore described and any of the following ink media.

1
Water (61)
Glycerol (25)
Triethanolamine (10)
3
Water (72)
Propylene glycol (20)
Dimethylformamide (5)
5
Water (72)
Propylene glycol (20)
Dimethylformamide (5)
7
Water (52)
Diethylene glycol (30)
N—Me—2-pyrrolidone (15)
9
Water (57)
Ethyl alcohol (10)
Glycerol (30)
Na dehydroacetate (0.1)
11
Water (67)
Diethylene glycol (30)
Me 4-hydroxybenzoate (0.1)
13
Water (58)
Diethylene glycol (28)
N—methyl-2-pyrrolidone (9)
15

2
Water (62)
Ethylene glycol (39)
1,2,6-Hexanetriol (5)
4
Water (68)
2-MeO—2-EtO—2-
EtO—ethanol (30)
Polyoxyethylated
4-nonylphenol (0.1)
6
Water (50)
Diethylene glycol (25)
N—Methyl-2-pyrrolidone (20)
8
Water (61)
Diethylene glycol (20)
1,3-Dimethyl-2-imidazolidinone (15)
10
Water (50)
Diethylene glycol (20)
N—Me—2-pyrrolidone (15)
Polyethylene glycol (MW 200) (10)
12
Water (64)
Ethylene glycol (30)
Polyethylene glycol (MW 200) (3)
14
Water (60)
Diethylene glycol (35)

-continued

Water (56)
Diethyleneglycol (30)
2-MeO—2-EthO—2-
EtO-ethanol (10)

We claim:
1. An ink comprising at least one water-soluble dye, free from cellulose-reactive groups, of the formula:

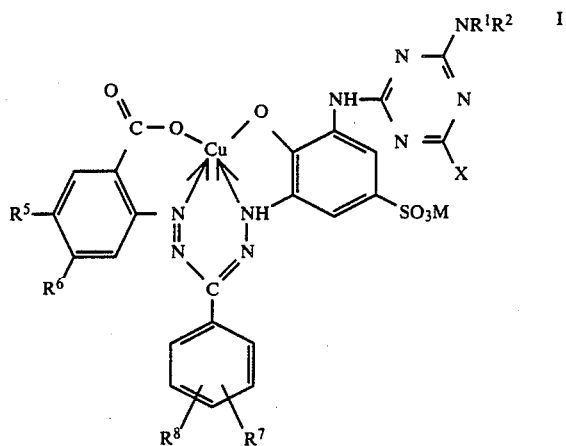

wherein,
$R^1$ is —$(C_aH_{2a}O)_m(C_bH_{2b}O)_nH$,
$R^2$ is H or —$(C_aH_{2a}O)_m(C_bH_{2b}O)_nH$, or
$R^1$ and $R^2$ together with the nitrogen atom form a morpholine ring;
a and b are different and from 2 to 8
m is from 1 to 10;
n is from 0 to 9;
M is H, ammonium or sodium, potassium or lithium;
X is (i) $NR^1R^2$, (ii) $NR^3R^4$, in which $R^3$ and $R^4$ are each independently selected from H, alkyl and aryl, or (iii) a mono- or dis-azo chromophore consisting of benzene, naphthalene or mono- or bicyclic heteroaryl diazo and coupling components linked to the triazine nucleus through an amino linking group, N—$R^9$, in which $R^9$ is H, $C_{1-4}$-alkyl or phenyl;
$R^5$ and $R^6$ are selected from $SO_3M$ and H provided at least one is $SO_3M$;
$R^7$ is H, halogen, $C_{1-4}$ alkyl, $C_{1-4}$ alkoxy, $SO_3M$ or COOM; and $R^8$ is H or $SO_3M$.

2. An ink according to claim 1 wherein $NR^1R^2$ is selected from hydroxyethylamino, di(hydroxyethyl)amino and morpholino.

3. An ink according to claim 1 wherein X is a monoazo chromophore consisting of a benzene or naphthalene diazo component and a benzene, naphthalene or monoheterocyclic coupling component linked to the triazine group through an amine linking group, N—$R^9$, in which $R^9$ is H, $C_{1-4}$-alkyl or phenyl.

4. An ink according to claim 1 wherein X is a disazo chromophore consisting of benzene or naphthalene diazo and coupling components linked to the triazine group through an amine linking group, N—$R^9$, in which $R^9$ is H, $C_{1-4}$-alkyl or phenyl.

5. An ink according to claim 3 wherein X carries from 1 to 5 —$SO_3M$ groups.

6. An ink according to claim 1 carrying from 3 to 8 —$SO_3M$ groups.

7. An ink according to claim 1 wherein $R^5$ is $SO_3M$ and $R^6=R^7=R^8=H$.

8. The ink of claim 1 in which $R^1=C_2H_4OH$, $R^5=SO_3Na$, $R^2=R^6=R^7=R^8=H$, M=Na and X is 5-hydroxy-6-(2-sulphophenyl).

9. An ink, according to claim 1, suitable for an ink jet recording system of the type in which an ink is ejected from a small orifice in the form of droplets directed towards a substrate on which an image is to be formed.

10. An ink according to claim 1 wherein the dye is dissolved in water or a mixture of water and a water-miscible organic solvent.

11. An ink according to claim 10 wherein the water-miscible organic solvent is a polyhydric alcohol.

12. An ink according to claim 1 containing from 0.5% to 20% by weight of the dye.

13. An ink according to claim 1 wherein $R^1=C_2H_4OH$, $R^5=SO_3Na$, $R^2=R^6=R^7=R^8=H$, M=Na and X is 5-hydroxy-6-(2-sulphophenylazo)-7-sulphonaphth-2-ylamino as the sodium salt.

14. An ink according to claim 1 wherein —$NR^1R^2$=morpholino, $R^5=SO_3Na$, $R^6=R^7=R^8=H$, M=Na and X is 6-sulpho-7-(3,6,8-trisulphonaphth-2-ylazo)-8-hydroxy-naphth-2-ylamino as the sodium salt.

15. An ink according to claim 1 wherein $R^1=R^2=C_2H_4OH$, $R^5=SO_3Na$, $R^6=R^7=R^8=H$, M=Na and X is 3-sulpho-4-(1-(4-sulphophenyl)-3-carboxypyrazolin-5-on-4-ylazo)-phenylamino as the sodium salt.

16. An ink according to claim 1 wherein $R^1=C_2H_4OH$, $R^5=SO_3Na$, $R^2=R^6=R^7=R^8=H$, M=Na and X is 3-ureido-4-(3,6,8-trisulphonaphth-2-ylazo)-phenylamino as the sodium salt.

17. An ink according to claim 1 wherein $R^1=C_2H_4OH$, $R^5=SO_3Na$, $R^2=R^6=R^7=R^8=H$, M=Na and X is 3-ureido-4-(2,5-dimethyl-4-(2,5-disulphophenylazo)phenyl-azo)phenyl-amino as the sodium salt.

18. An ink according to claim 1 wherein $R^1=C_2H_4OH$, $R^5=SO_3Na$, $R^2=R^6=R^7=R^8=H$, M=Na and X is 5-hydroxy-6-(1,5-disulphonaphth-2-ylazo)-7-sulphonaphth-2-ylamino as the sodium salt.

19. An ink according to claim 1 wherein $R^1=C_2H_4OH$, $R^5=SO_3Na$, $R^2=R^6=R^7=R^8=H$, M=Na and X is N-(5-hydroxy-6-(1,5-disulphonaphth-2-ylazo)-7-sulpho-naphth-2-yl)-N-methylamino as the sodium salt.

20. An ink according to claim 1 wherein $R^1=R^2=C_2H_4OH$, $R^5=SO_3Na$, $R^6=R^7=R^8=H$, M=Na and X is 3-(1-(4-sulphophenyl)-3-carboxypyrazolin-5-on-4-ylazo)-4-sulphophenylamino as the sodium salt.

21. An ink according to claim 1 wherein $R^1=$3-hydroxypropyl, $R^2=H$, $R^5=R^6=SO_3M$, M=Na, $R^7=R^8=H$ and X is 3-methyl-4-(4,8-disulphonaphth-2-ylazo)phenyl-amino as the sodium salt.

22. An ink according to claim 1 wherein $R^1=(CH_2)_6OH$, $R^6=SO_3M$, $R^2=R^5=R^7=R^8=H$, M=Na and X is 5-hydroxy-6-(2-sulpho-4-methoxyphenylazo)-7-sulphonaphth-2-ylamino as the sodium salt.

23. An ink according to claim 1 wherein $R^1=C_2H_4OH$, $R^5=SO_3M$, $R^7=$2-$SO_3M$, $R^2=R^6=R^8=H$, M=Na and X is N-(5-hydroxy-6-(2-sulpho-4-methoxyphenylazo)-7-sulphonaphth-2-yl)-N-methylamino as the sodium salt.

24. An ink according to claim 1 wherein $R^1=C_2H_4OH$, $R^5=SO_3Na$, $R^2=R^6=R^8=H$, $R^7=$4-

SO$_3$M, M=Na and X is 2,4-disulpho-5-(1-ethyl-2,6-dihydroxy-3-amino-carbonyl-4-methylpyrid-5-ylazo)-phenylamino as the sodium salt.

25. An ink according to claim 1 wherein R$^1$=C$_2$H$_4$OH, R$^5$=SO$_3$Na, R$^2$=R$^6$=H, R$^7$=2-Cl, R$^8$=5-SO$_3$M, M=Na and X is 2,5-disulpho-4-(1-(4-sulphophenyl)-3-methyl-5-hydroxypyrazol-4-ylazo)-phenylamino as the sodium salt.

26. An ink according to claim 1 wherein R$^1$=C$_2$H$_4$OH, R$^5$=SO$_3$Na, R$^2$=R$^6$=H, R$^7$=2-SO$_3$M, R$^8$=4-SO$_3$M, M=Na and X is 4-sulpho-3-(1(2,5-dichloro-4-sulphophenyl)-3-methyl-5-hydroxypyrazol-4-ylazo)-phenylamino as the sodium salt.

27. An ink according to claim 1 wherein R$^1$=C$_2$H$_4$OH, R$^5$=SO$_3$Na, R$^2$=R$^6$=R$^7$=R$^8$=H, M=Na and X is N-(4-(3-sulpho-4-(4-nitro-2-sulphophenylethenyl)phenylazo)-phenyl)-N-methylamino as the sodium salt.

28. An ink according to claim 1 wherein R$^1$=C$_2$H$_4$OH, Rhu 5=SO$_3$Na, R$^2$=R$^6$=R$^7$=R$^8$=H, M=Na and X is 3-acetylamino-4-(4,8-disulphonaphth-2-ylazo)-phenylamino as the sodium salt.

29. An ink according to claim 1 wherein R$^1$=C$_2$H$_4$OH, R$^5$=SO$_3$Na, R$^2$=R$^6$=H, R$^7$=2-SO$_3$M, R$^8$=4-SO$_3$M, M=Na and X is 2-methoxy-4-(3-sulphophenylazo)phenylamino as the sodium salt.

30. An ink according to claim 1 wherein R$^1$=(CH$_2$)$_6$OH, R$^6$=SO$_3$M, R$^2$=R$^5$=R$^7$=R$^8$=H, M=Na and X=5-hydroxy-6-(2-sulpho-4-acetylamino-phenylazo)-7-sulpho-naphth-2-ylamino as the sodium salt.

31. An ink according to claim 1 wherein R$^1$=(CH$_2$)$_6$OH, R$^6$=SO$_3$M, R$^2$=R$^5$=R$^7$=R$^8$=H, M=Na and X=5-hydroxy-6-(2,5-disulpho-4-methoxy-phenylazo)-7-sulpho-naphth-2-ylamino as the sodium salt.

32. An ink according to claim 1 wherein R$^1$=C$_2$H$_4$OH, Rhu 5=SO$_3$Na, R$^2$=R$^6$=H, R$^7$=2-Cl, R$^8$=5-SO$_3$M, M=Na and X is 2-methoxy-5-methyl-4-(4,8-disulpho-naphth-2-ylazo)phenylamino as the sodium salt.

33. An ink according to claim 1 wherein R$^1$=C$_2$H$_4$OH, R$^5$=SO$_3$Na, R$^2$=R$^6$=R$^7$=H, R$^8$=4-SO$_3$M, M=Na and X is 4-sulpho-3-(1-hydroxy-3,6-disulphonaphth-2-ylazo)-phenylamino as the sodium salt.

34. An ink according to claim 1 wherein R$^1$=C$_2$H$_4$OH, Rhu 5=SO$_3$M, R$^2$=R$^6$=R$^8$=H, R$^7$=2-SO$_3$M, M=Na and X is 4-sulpho-3-(1-hydroxy-3,6-disulpho-7-benzoylamino-naphth-2-ylazo)-phenylamino as the sodium salt.

35. An ink according to claim 1 wherein R$^1$=C$_2$H$_4$OH, R$^5$=SO$_3$M, R$^2$=R$^6$=H, R$^7$=R$^8$=2,4-SO$_3$M, M=Na and X is 3,6-disulpho-7-phenylazo-8-hydroxynaphth-1-ylamino as the sodium salt.

36. An ink according to claim 1 wherein R$^1$=C$_2$H$_4$OH, R$^5$=SO$_3$Na, R$^2$=R$^6$=H, R$^7$=2-Cl, M=Na, R$^8$=5-SO$_3$M and X is 4-(2-methyl-4-(2,5-disulphophenylazo)-5-methoxy-phenylazo)-6-sulphonaphth-1-ylamino as the sodium salt.

* * * * *